Sept. 25, 1923.

B. P. HALL 1,468,965

PROCESS OF PRODUCING IMAGES BY TRANSMITTED LIGHT

Filed March 25, 1921

INVENTOR
Burton P. Hall
BY his ATTORNEY
Israel Benjamins.

Patented Sept. 25, 1923.

1,468,965

UNITED STATES PATENT OFFICE.

BURTON P. HALL, OF FANWOOD, NEW JERSEY.

PROCESS OF PRODUCING IMAGES BY TRANSMITTED LIGHT.

Application filed March 25, 1921. Serial No. 455,517.

*To all whom it may concern:*

Be it known that I, BURTON P. HALL, a citizen of the United States, residing at Fanwood, in the county of Union and State of New Jersey, have invented a new and useful improvement in the processes of producing images by transmitted light which is applicable to photography and the production of motion pictures and other pictures projected on reflecting surfaces, such as stereopticon views.

This invention consists in the novel features hereinafter more fully described and the objects of it are:

First: to produce superior images by transmitted light;

Second: to have the process of producing said images comparatively simple and inexpensive.

Figure 1:
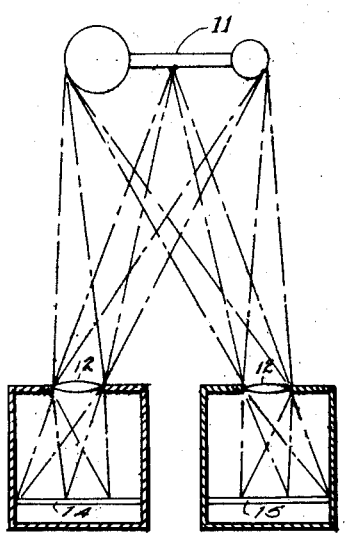
Figure 2:
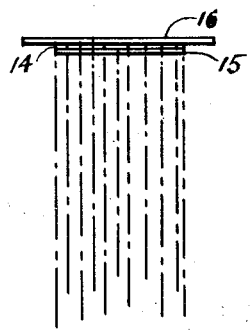

I attain these objects by the following process, which is diagrammatically illustrated in the accompanying drawings, in which Fig. 1 is a plan, partly in elevation, partly in section, and Fig. 2 is an edge view.

First: I prepare two or more photographic negatives 14 and 15 of the same objects, preferably by simultaneous exposure through lenses 12 situated a suitable distance apart as shown in Fig. 1.

Second: I combine these negatives 14 and 15 by superposing one upon the other; in this way I produce a composite positive 16, which in the case of photography, is the resultant picture, and in the case of motion picture apparatuses the composite positive is the resultant picture on the film through which the light is projected on to suitable reflecting surfaces.

When the negatives are prepared as above described, then, by superposing the said two or more negatives, the composite positive produced will embody a superior image of the objects to which the negatives were exposed and will be superior to the positives produced from each of these negatives separately in point of the lucidity of the images.

The foregoing statements refer to photographs obtained by the above described process and also to the images projected on to suitable reflecting surfaces through the composite positives on the films, obtained by superposition as above described.

What I claim as my invention, and desire to secure by Letters Patent, is:

In the art of producing images by transmitted light the process of first preparing multiple component negatives of the same objects by the method of simultaneous exposure through lenses situated a suitable distance apart and then combining these negatives by superposition to produce a composite positive.

BURTON P. HALL.